United States Patent
Morris

(10) Patent No.: US 10,422,093 B2
(45) Date of Patent: Sep. 24, 2019

(54) METHODS OF MARSH RESTORATION VIA RESUSPENSION OF SEDIMENT

(71) Applicant: University of South Carolina, Columbia, SC (US)

(72) Inventor: James Morris, Columbia, SC (US)

(73) Assignee: University of South Carolina, Columbia, SC (US)

(*) Notice: Subject to any disclaimer, the term of this patent is extended or adjusted under 35 U.S.C. 154(b) by 388 days.

(21) Appl. No.: 14/725,267

(22) Filed: May 29, 2015

(65) Prior Publication Data

US 2015/0345091 A1 Dec. 3, 2015

Related U.S. Application Data

(60) Provisional application No. 62/005,391, filed on May 30, 2014.

(51) Int. Cl.
*E02B 3/02* (2006.01)

(52) U.S. Cl.
CPC .......... *E02B 3/023* (2013.01); *E02B 2201/02* (2013.01); *Y02A 10/22* (2018.01); *Y02A 10/28* (2018.01); *Y02A 40/228* (2018.01)

(58) Field of Classification Search
CPC combination set(s) only.
See application file for complete search history.

(56) References Cited

U.S. PATENT DOCUMENTS

| | | | | |
|---|---|---|---|---|
| 301,682 A * | 7/1884 | Coiseau | ........... | E02F 5/287 37/344 |
| 418,000 A * | 12/1889 | Fletcher | ........... | E02F 5/287 37/344 |
| 445,862 A * | 2/1891 | Roessler | ........... | E02F 5/287 37/344 |
| 1,698,515 A * | 1/1929 | Stewart | ........... | E02F 5/287 37/344 |
| 4,819,347 A * | 4/1989 | Lofgren | ........... | E02F 5/287 37/195 |
| 5,428,908 A * | 7/1995 | Kerfoot | ........... | E02F 3/925 37/318 |
| 5,778,568 A * | 7/1998 | Toyoshima | ........... | E02F 3/081 37/338 |

* cited by examiner

*Primary Examiner* — Kyle Armstrong
(74) *Attorney, Agent, or Firm* — Dority & Manning, P.A.

(57) ABSTRACT

Methods for restoring tidal areas adjacent to a tidal water area are provided. The method can comprise: pumping water from the tidal water area; and directing a high-pressure water stream, using the water pumped from the tidal water area, to the bottom surface of the tidal water area during an incoming tide period. The high-pressure water stream impacts the bottom surface of the tidal water area with sufficient force to dislodge sediment from the bottom surface into the tidal water area.

7 Claims, 4 Drawing Sheets

METHODS OF MARSH RESTORATION VIA RESUSPENSION OF SEDIMENT

PRIORITY INFORMATION

The present application claims priority to U.S. Provisional Patent Application Ser. No. 62/005,391 titled "Methods of Marsh Restoration via Resuspension of Sediment" of James Morris filed on May 30, 2014, the disclosure of which is incorporated by reference herein.

BACKGROUND

Tidal marshes maintain relative elevation (relative to mean sea level) by trapping sediment that is suspended in flood water. Tidal marshes flood daily at high tide, and the amount of sediment that is retained by the marsh is proportional to the concentration of sediment suspended in the water, the biomass of the vegetation on the marsh surface, and the duration of the flood. In many estuaries marshes are disappearing because sea level is rising faster than the marsh can trap sediment, i.e. there is a sediment deficit. Even in the absence of sea-level rise, a sediment deficit can develop when sediment discharge from the watershed decreases or when levees are constructed to prevent flooding or to serve navigation interests. Sediment discharge from the watershed decreases when dams are constructed on the tributaries. Abandonment of agriculture and reforestation, adoption of water quality practices that reduce turbidity or even repopulation of beaver also reduce sediment discharge.

The State of Louisiana's Coastal Protection and Restoration Authority (CPRA) 2012 Coastal Master Plan is based on a two year analysis involving some of the state's best scientists as well as national and international specialists. "The state used this analysis to select 109 high performing projects that could deliver measurable benefits to our communities and coastal ecosystem over the coming decades. The plan shows that if these projects were fully funded, at a price tag of $50 billion, flood protection for communities could be substantially increased and a sustainable coast could be created. Louisiana is in the midst of a land loss crisis that has claimed 1,880 square miles of land since the 1930s. Given the importance of so many of south Louisiana's natural assets—its waterways, natural resources, unique culture, and wetlands—this land loss crisis is nothing short of a national emergency, one that takes a daily toll on the lives of coastal residents. To address this crisis the Louisiana Legislature passed Act 8 in 2006, which created the CPRA and required it to develop a coastal master plan every five years. The first master plan was approved by the legislature in 2007. The 2012 master plan was submitted to the legislature for approval on March 26th and was unanimously approved by the legislature on May 22, 2012". The CPRA master plan proposes that marsh restoration can be done by constructing a series of diversions along the Mississippi River that essentially siphon muddy water into the bayous behind the levees or conveying sediment to restoration sites by pipelines, However, these are highly controversial proposals because 1) each diversion is essentially a point source that supplies sediment only locally, 2) the diversions are expensive engineering works and are fixed in place, 3) diversions can alter the salinity of the estuary and disrupt traditional fisheries (e.g. oysters), and 3) the high nutrient concentration of the Mississippi River is thought by some to be harmful to the marshes.

As such, a need exists for an improved sediment management plan for the restoration and/or maintenance of tidal marsh areas.

SUMMARY

Objects and advantages of the invention will be set forth in part in the following description, or may be obvious from the description, or may be learned through practice of the invention.

Methods are generally provided fix restoring intertidal areas adjacent to subtidal water areas. As used herein, the "intertidal area" is subaerial during low tide stages, and the "subtidal water area" has a volume of water over a bottom surface at all tide levels.

In one embodiment, the method comprises: pumping water from the subtidal water area; and directing a high-pressure water stream, using the water pumped from the subtidal water area, to the bottom surface of the subtidal water area during an incoming tide period. The high-pressure water stream impacts the bottom surface of the subtidal water area with sufficient force to dislodge sediment from the bottom surface into the subtidal water area.

In one particular embodiment, the method further comprises: stopping the high-pressure water stream during an outgoing tide period. For example, the high-pressure water stream can be directed to the bottom surface only during incoming tide periods.

Pumping water from the subtidal water area and directing the high-pressure water stream to the bottom surface of the subtidal water can be simultaneously accomplished on a surface vessel positioned in the tidal water area. In particular embodiments, the surface vessel moves within the subtidal water area such that the high-pressure water stream is directed to different areas of the bottom surface. For example, the surface vessel can move within the subtidal water area during an incoming tide.

Methods are also generally provided for establishing a channel in a tidal waterway. In one embodiment, such a method comprises: pumping water from the tidal water area; and directing a high-pressure water stream, using the water pumped from the tidal water area, to the bottom surface of the tidal water area. The high-pressure water stream impacts the bottom surface of the tidal water area with sufficient force to dislodge sediment from the bottom surface into the tidal water area. In such a method, the high-pressure water stream is directed to the bottom surface during an incoming tide period and/or during an outgoing tide period.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Figure 1:
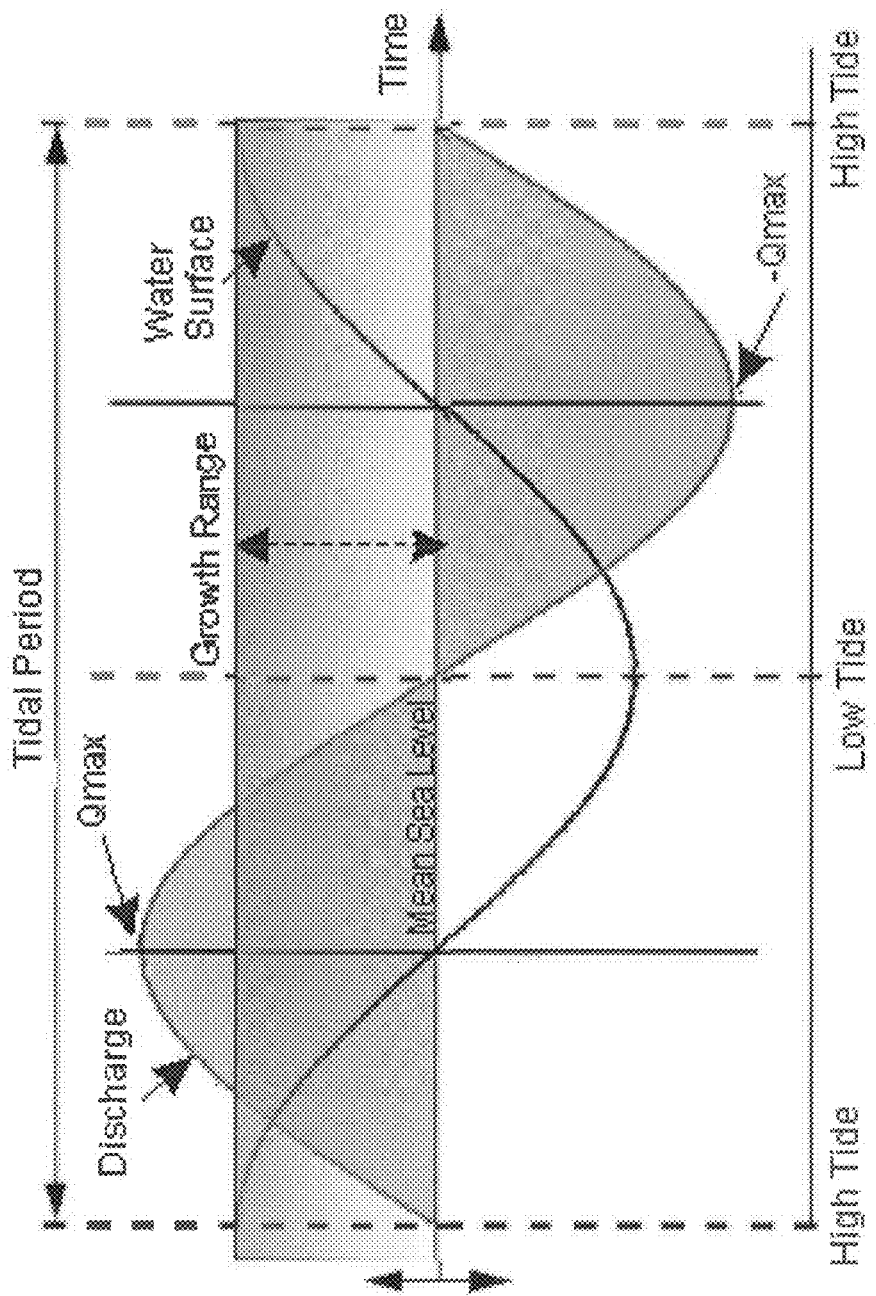
FIG. 1 shows the water level and velocities during different stages of the tide (modified from: Neill, Charles, 1973, "Guide to bridge Hydraulics", Roads and Transportation Association of Canada, University of Toronto, Canada).

The present disclosure is generally directed to a method of restoring tidal areas, such as marsh lands, creek beds, etc. FIG. 1 shows the water level and velocities during different stages of the tide (modified from: Neill, Charles, 1973. "Guide to bridge Hydraulics", Roads and Transportation Association of Canada, University of Toronto, Canada). Marsh vegetation will survive within the top half of the tidal frame (shaded area labeled "Growth Range"), but resilience to sea-level rise and effectiveness as protection from storm surge increase when the vegetation grows at a higher elevation.

In order to increase the elevation of these tidal areas, the presently described methods act to resuspend sediment from the bottoms of the subtidal water area (e.g., tidal inlet, tidal creek, tidal sound, etc.) during incoming tides by hydraulic resuspension. For example, the method utilizes a high-pressure water stream (i.e., a hydraulic jet stream) to mine sediment from the bottom of the tidal creeks, channels, or rivers during the flood tide. The operation of the high-pressure water stream greatly increases the concentration of sediment in the flood water such that the sedimentation rate on the marsh surface is significantly raised.

Figure 2:
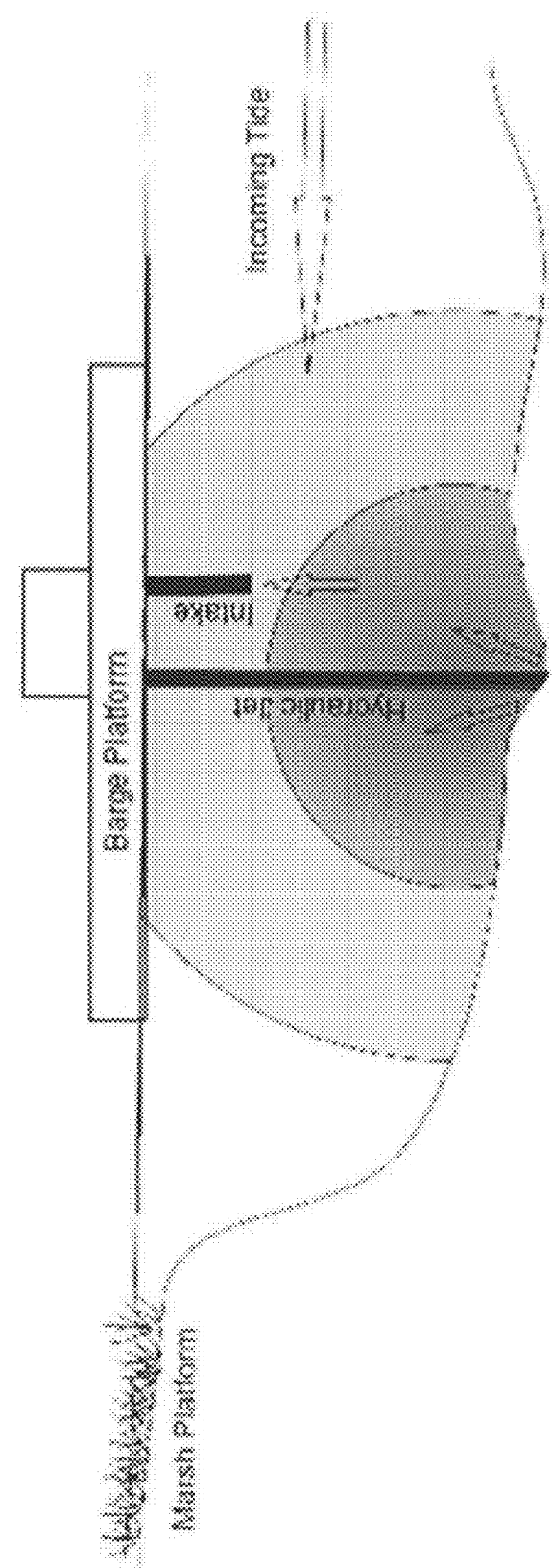
FIG. 2 shows a general illustration of an exemplary embodiment of the present invention. that utilizes a hydraulic water jet to eject sediment from the bottom of the waterway into the water column on the incoming or flood tides.

Referring to FIG. 2, a barge platform is shown having a waterjet pump (also known as a "water blaster") positioned thereon for pumping water from the subtidal water area through the intake. Then, the waterjet pump creates and directs a high-pressure water stream (i.e., a "hydraulic jet") to the bottom surface of the subtidal water area during the incoming tide. The sediment dislodged from the bottom surface through the force of the high-pressure water stream increases the concentration of the sediment in the tidal water area such that more sediment is washed onto the flooded tidal lands (represented in FIG. 2 by the Marsh platform).

Figure 3A:
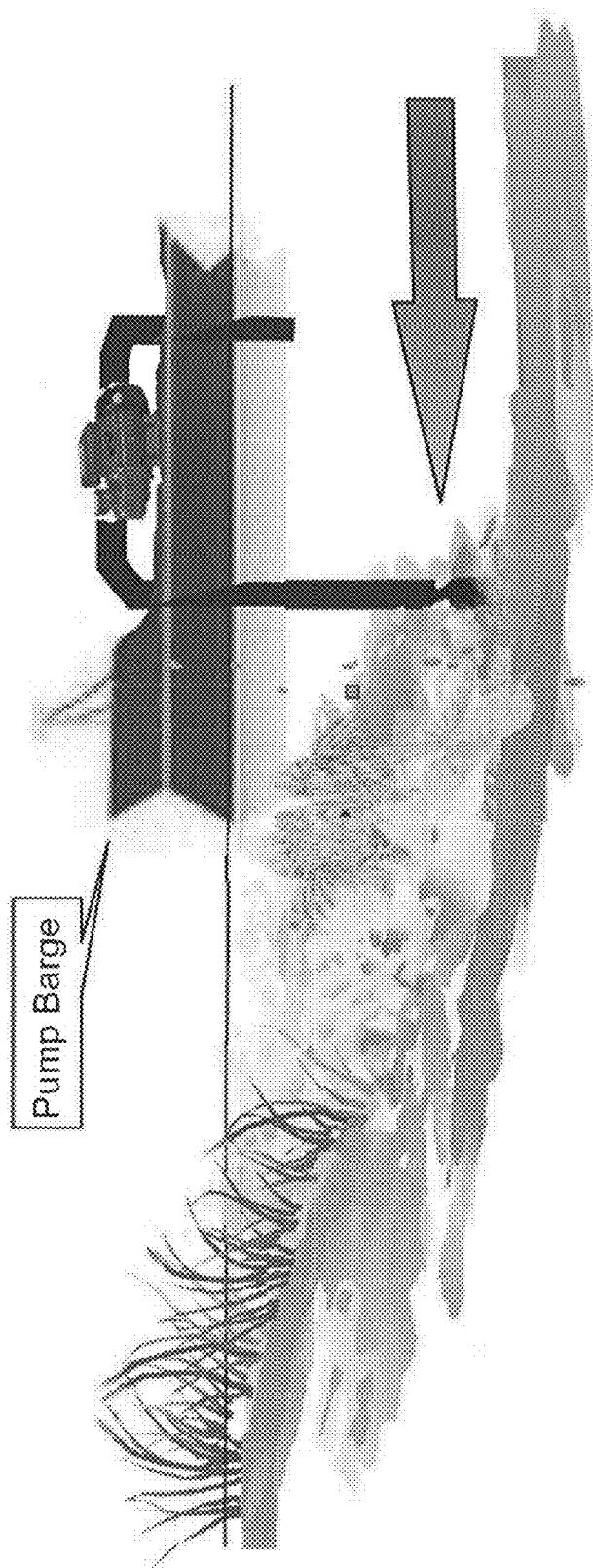
FIG. 3a shows another general illustration of an exemplary embodiment of the present invention where, on the incoming tide, a hydraulic water jet mixes the sediment from the bottom of the waterway into the water column on the incoming or flood tides.
Figure 3B:
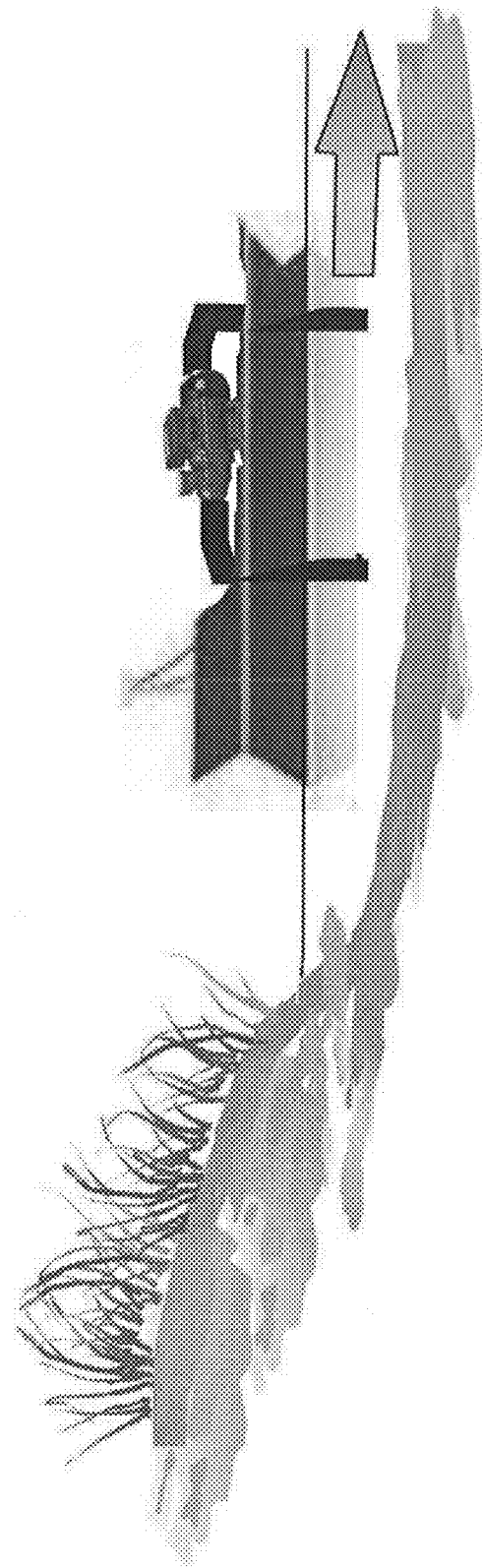
FIG. 3b shows a general illustration of the exemplary embodiment of FIG. 3a where, on the outgoing tide, the hydraulic jet is quiet during the ebbing or receding tide when the flow of water is in the downstream direction and the wetlands are subaerial.

In certain embodiments, the high-pressure water stream would operate only during the incoming tide period. FIGS. 3a and 3b show such an embodiment, where the waterjet pump is operating during the incoming tide but not operating during the outgoing tide.

During operation, the barge can move around within the subtidal water area such that the high-pressure water stream is directed to different areas of the bottom surface during its operation.

Although depicted on a barge, the waterjet pumps can be operated on any suitable floating platforms (e.g., boat, barge, or other surface vessel). Consequently, the geographic extent of their operation within an estuary is essentially unlimited. The platform(s) can be operated within a certain tidal water area for a sufficient period to achieve a healthy accumulation of sediment in the marshes. Subsequently, the platforms could be redeployed to other areas.

In an alternative embodiment, the method can be utilized to establish a channel or to dredge an existing channel in a tidal waterway. That is, the high-pressure water stream can be operated to dredge a channel into the bottom surface via use of a high-pressure water stream. The tidal flow of the waterway can then be utilized to carry the sediment in and/or out of the tidal water area to artificially lower the bottom surface making the channel deeper.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A method of restoring intertidal areas adjacent to subtidal water areas, wherein the intertidal area is subaerial during low tide stages and the subtidal water area has a volume of water over a bottom surface at all tide levels, the method comprising:
    pumping water from the subtidal water area; and
    directing a high-pressure water stream, using the water pumped from the subtidal water area, to the bottom surface of the subtidal water area during an incoming tide period, wherein the high-pressure water stream impacts the bottom surface of the subtidal water area with sufficient force to dislodge sediment from the bottom surface into the subtidal water area, the dislodged sediment thereafter being carried onto the intertidal area by the incoming tide such that an elevation of the intertidal area is increased.

2. The method of claim 1, further comprising:
    stopping the high-pressure water stream during an outgoing tide period.

3. The method of claim 1, wherein the high-pressure water stream is directed to the bottom surface only during incoming tide periods.

4. The method of claim 1, wherein pumping water from the subtidal water area and directing the high-pressure water stream to the bottom surface of the subtidal water are simultaneously accomplished on a surface vessel positioned in the subtidal water area.

5. The method of claim 4, wherein the surface vessel moves within the subtidal water area such that the high-pressure water stream is directed to different areas of the bottom surface.

6. The method of claim 5, wherein the surface vessel moves within the subtidal water area during an incoming tide.

7. The method of claim 1, wherein pumping water from the subtidal water area and directing the high-pressure water stream to the bottom surface of the tidal water are ultaneously accomplished using a waterjet pump.

* * * * *